United States Patent
Hahn et al.

(10) Patent No.: US 8,936,047 B2
(45) Date of Patent: Jan. 20, 2015

(54) REINFORCED HOSE ASSEMBLY

(75) Inventors: Rich Hahn, Ortonville, MI (US); Elvis Alihodzic, New Britain, CT (US); George Fetzer, Burlington, CT (US)

(73) Assignee: Kongsberg Actuation Systems II, Inc., Suffield, CT (US)

( * ) Notice: Subject to any disclaimer, the term of this patent is extended or adjusted under 35 U.S.C. 154(b) by 467 days.

(21) Appl. No.: 13/154,737

(22) Filed: Jun. 7, 2011

(65) Prior Publication Data

US 2011/0297268 A1 Dec. 8, 2011

Related U.S. Application Data

(60) Provisional application No. 61/352,273, filed on Jun. 7, 2010.

(51) Int. Cl.
| | |
|---|---|
| *F16L 11/00* | (2006.01) |
| *F16L 11/115* | (2006.01) |
| *B29C 53/58* | (2006.01) |
| *B29D 23/18* | (2006.01) |

(Continued)

(52) U.S. Cl.
CPC ............... *F16L 11/115* (2013.01); *B29C 53/58* (2013.01); *B29D 23/18* (2013.01); *B29C 47/0023* (2013.01); *B29C 47/003* (2013.01); *B29C 47/0033* (2013.01); *B29C 59/103* (2013.01); *B29C 59/142* (2013.01); *B29K 2027/12* (2013.01); *B29C 47/065* (2013.01); *B29K 2023/18* (2013.01); *B29C 47/8895* (2013.01); *B29K 2027/00* (2013.01)
USPC .............................. 138/121; 138/122; 138/137

(58) Field of Classification Search
USPC .................................. 138/121, 122, 125, 137
See application file for complete search history.

(56) References Cited

U.S. PATENT DOCUMENTS

| | | | |
|---|---|---|---|
| 325,591 | A | 9/1885 | Coultaus |
| 2,032,753 | A | 3/1936 | James |

(Continued)

FOREIGN PATENT DOCUMENTS

| | | | |
|---|---|---|---|
| EP | 0114212 A2 | 8/1984 | |
| EP | 0288282 A1 | 10/1988 | |

(Continued)

OTHER PUBLICATIONS

"Bioflex the Ultimate Smoothbore PTFE Lined Flexible Hose for Use in Pharma and Biotech Applications"; www.aflex-hose.com; Feb. 27, 2009; 6 pages.

(Continued)

*Primary Examiner* — Frederick C Nicolas
(74) *Attorney, Agent, or Firm* — Howard & Howard Attorneys PLLC

(57) ABSTRACT

A reinforced hose assembly includes tubular inner layers with a uniform interior radial surface and an exterior radial surface. The tubular inner layer defines a longitudinal axis along a length thereof and comprises a first fluorocarbon polymer. The reinforced hose assembly also includes a bonding layer comprising a second fluorocarbon polymer. The bonding layer is disposed about the exterior radial surface of the tubular inner layer. The reinforced hose assembly also includes a reinforcing element comprising the second fluorocarbon polymer, attached to bonding layer and helically disposed about the tubular inner layer at a predetermined helical pitch measured relative to the longitudinal axis of the tubular inner layer.

18 Claims, 3 Drawing Sheets

(51) Int. Cl.

| | | |
|---|---|---|
| *B29C 47/00* | (2006.01) | |
| *B29C 59/10* | (2006.01) | |
| *B29C 59/14* | (2006.01) | |
| *B29K 27/12* | (2006.01) | |
| *B29C 47/06* | (2006.01) | |
| *B29K 23/00* | (2006.01) | |
| *B29C 47/88* | (2006.01) | |
| *B29K 27/00* | (2006.01) | |

(56) References Cited

U.S. PATENT DOCUMENTS

| | | | |
|---|---|---|---|
| 3,891,007 A | | 6/1975 | Kleykamp |
| 3,938,929 A | | 2/1976 | Stent et al. |
| 4,012,272 A | | 3/1977 | Tiner |
| 4,295,496 A | | 10/1981 | Bixby |
| 4,304,266 A | | 12/1981 | Kutnyak et al. |
| 4,383,555 A | | 5/1983 | Finley |
| 4,456,034 A | | 6/1984 | Bixby |
| 4,471,813 A | | 9/1984 | Cothran |
| 4,599,784 A | * | 7/1986 | Canu et al. ............ 29/450 |
| 4,628,966 A | | 12/1986 | Kanao |
| 4,842,023 A | | 6/1989 | Whitworth |
| 5,380,304 A | * | 1/1995 | Parker ............ 604/526 |
| 5,381,834 A | * | 1/1995 | King ............ 138/125 |
| 5,476,080 A | | 12/1995 | Brunnhofer |
| 5,715,870 A | | 2/1998 | Winter et al. |
| 5,792,401 A | | 8/1998 | Burnham |
| 5,884,670 A | | 3/1999 | Akedo et al. |
| 5,899,237 A | | 5/1999 | Akedo et al. |
| 5,938,587 A | | 8/1999 | Taylor et al. |
| 5,975,144 A | | 11/1999 | Akedo et al. |
| 6,056,018 A | | 5/2000 | Renaud |
| 6,152,186 A | | 11/2000 | Arney et al. |
| 6,216,743 B1 | | 4/2001 | Kosaki et al. |
| 6,250,340 B1 | | 6/2001 | Jones et al. |
| 6,302,150 B1 | * | 10/2001 | Martucci et al. ............ 138/125 |
| 6,390,141 B1 | | 5/2002 | Fisher et al. |
| 6,394,144 B1 | | 5/2002 | Whitworth |
| 6,698,457 B2 | | 3/2004 | Hayashi et al. |
| 6,742,545 B2 | | 6/2004 | Fisher et al. |
| 6,820,654 B2 | | 11/2004 | Lindsay |
| 6,827,109 B2 | | 12/2004 | McCaughtry |
| 6,907,906 B1 | | 6/2005 | Cook et al. |
| 7,055,553 B2 | * | 6/2006 | Bessette et al. ............ 138/141 |
| 7,291,240 B2 | | 11/2007 | Smith et al. |
| RE39,968 E | | 1/2008 | Whitworth |
| 7,468,116 B2 | | 12/2008 | Smith et al. |
| 7,490,632 B2 | * | 2/2009 | Grebe ............ 138/121 |
| 8,006,721 B2 | * | 8/2011 | Linhart et al. ............ 138/110 |
| 8,418,729 B2 | * | 4/2013 | Martucci et al. ............ 138/121 |

FOREIGN PATENT DOCUMENTS

| | | |
|---|---|---|
| EP | 0474449 B1 | 3/1992 |
| EP | 1141605 B1 | 10/2002 |
| FR | 1467950 A | 2/1967 |
| GB | 1092150 A | 11/1967 |
| GB | 1239387 A | 7/1971 |
| GB | 1431796 A | 4/1976 |
| GB | 1543586 A | 4/1979 |
| GB | 2126685 A | 3/1984 |
| GB | 2293222 A | 3/1996 |
| GB | 2345110 A | 6/2000 |
| WO | 9724543 A1 | 7/1997 |
| WO | 0039494 A1 | 7/2000 |
| WO | 0773461 A1 | 6/2007 |

OTHER PUBLICATIONS

"PTFE Tubing"; Grange Tubes; www.grangetubes.co.uk/home.htm; Apr. 10, 2005; 1 page.

"New Products"; Grange Tubes; www.grangetubes.co.uk/home.htm; Apr. 10, 2005; 1 page.

* cited by examiner

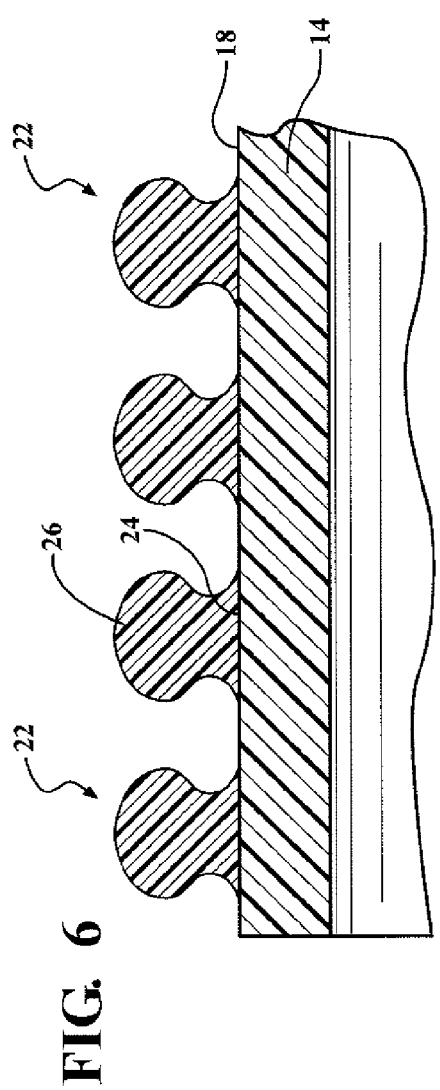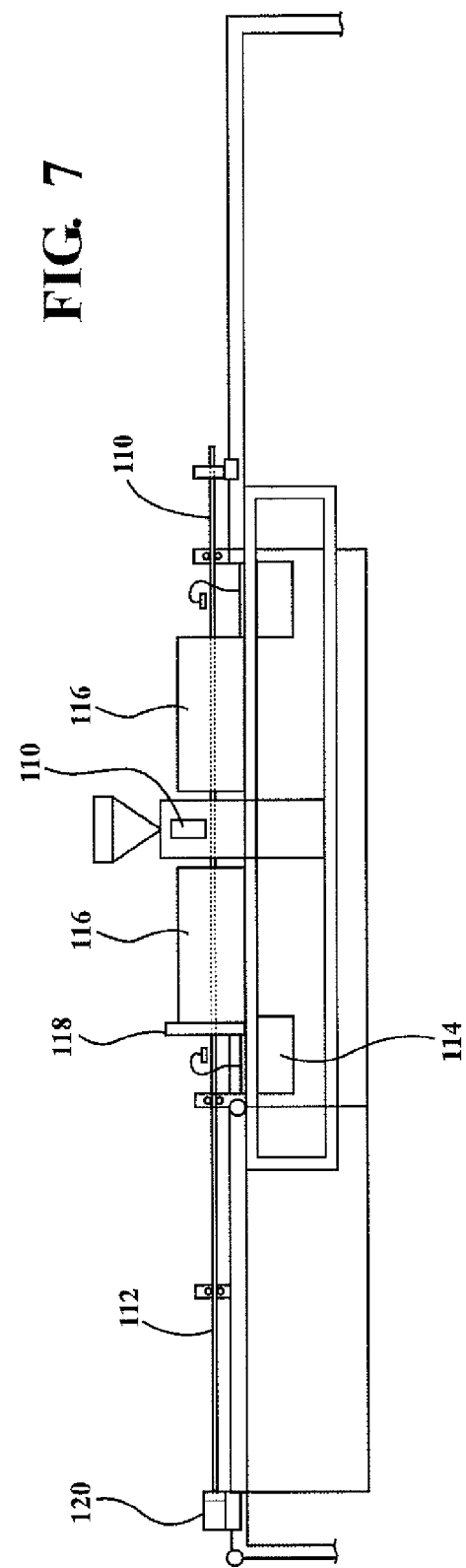

REINFORCED HOSE ASSEMBLY

CROSS REFERENCE TO RELATED APPLICATIONS

This application claims priority to and incorporates by reference U.S. Provisional Patent Application No. 61/352,273, which was filed on Jun. 7, 2010.

FIELD OF INVENTION

The present invention generally relates to a reinforced hose assembly. The present invention more particularly relates to a reinforced hose assembly that includes a uniform inner radial surface and a reinforcing element.

BACKGROUND OF THE INVENTION

Conventional reinforced hose assemblies have been used for the transfer of various fluids, such as gasoline, petroleum-based products, chemicals, food products, and others.

These conventional reinforced hose assemblies may be suitable for most applications where rigidity and strength are of primary importance, but many fail for high pressure applications where a small bend radius is necessary. Furthermore, conventional reinforced hoses have either a smooth inner surface, to allow for turbulence free fluid flow and ease of system cleaning, or a convoluted inner surface with undulations present on the inner and outer diameters, which provide for easy routing and improved resistance to kinks. These undulations cause pressure drops and flow disturbances throughout the length of the conventional reinforced hose assembly, which adds unnecessary pumping and fluid transfer costs to the application. These undulations also hold residual material making it difficult to clean the system for applications which use short shelf life materials or applications which use different materials and batches. The residual material build-up may result in contamination of subsequent material runs.

Accordingly, there remains a need for a reinforced hose assembly that is capable of forming small bend radii and provides a uniform inner radial surface.

SUMMARY OF THE INVENTION AND ADVANTAGES

A reinforced hose assembly is provided. The reinforced hose assembly includes a tubular inner layer having a uniform interior radial surface and an exterior radial surface. The tubular inner layer defines a longitudinal axis along a length thereof and comprises a first fluorocarbon polymer. The reinforced hose assembly also includes a bonding layer comprising a second fluorocarbon polymer. The bonding layer is disposed about the exterior radial surface of the tubular inner layer. The reinforced hose assembly also includes a reinforcing element comprising the second fluorocarbon polymer, attached to the bonding layer, and helically disposed about the tubular inner layer at a predetermined helical pitch measured relative to the longitudinal axis of the tubular inner layer.

The reinforced hose assembly of the present invention possesses adequate structural rigidity and strength and is also capable of forming small bend radii. The uniform inner radial surface is free from corrugation and undulations which results in less turbulence during fluid transport operations. The reinforced hose assembly is also safe for food and medical applications because there is minimal residual content build-up due to the uniform inner radial surface providing ease of cleaning or flushing between materials and batches.

BRIEF DESCRIPTION OF THE DRAWINGS

For a fuller understanding of the nature and objects of the invention, reference should be had to the following detailed description taken in connection with the accompanying drawings.

FIG. 6 is a cross-sectional view of the reinforced hose assembly without a bonding layer in accordance with another embodiment; and FIG. 7 is a schematic view of a process for manufacturing the reinforced hose assembly.

DETAILED DESCRIPTION OF THE INVENTION

Figure 1:
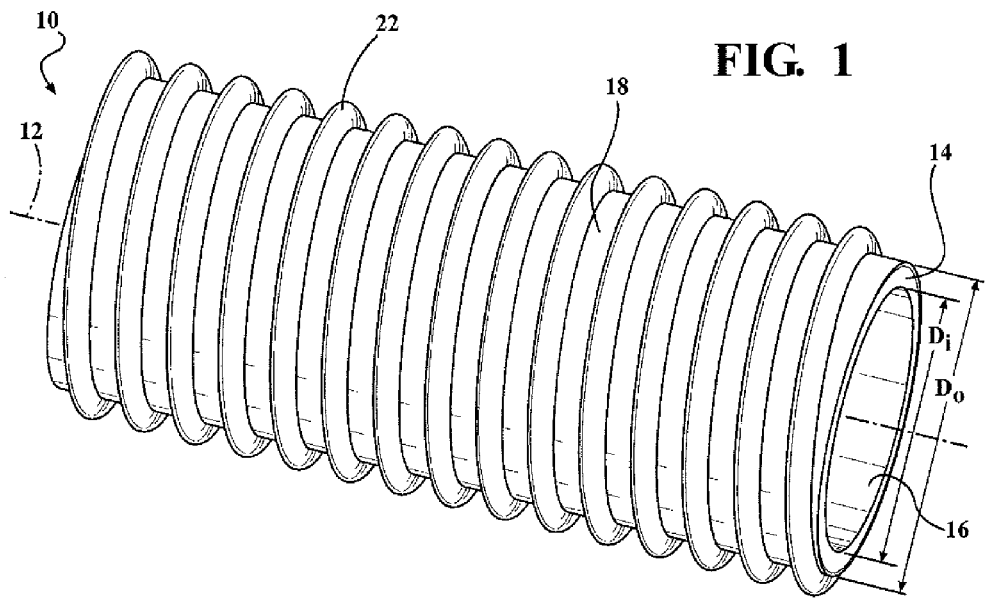
FIG. 1 is a perspective view of a representative reinforced hose assembly in accordance with one embodiment of the present invention.

Referring to FIG. 1, a reinforced hose assembly 10 is provided. In basic dimensions, the reinforced hose assembly 10 may define a longitudinal axis along a length of the reinforced hose assembly 10 such that the reinforced hose assembly 10 may extend axially to any length along the longitudinal axis 12.

The reinforced hose assembly 10 includes a tubular inner layer 14 having a uniform interior radial surface 16 and an exterior radial surface 18. The tubular inner layer 14 has an inner and outer diameter referenced, respectively, at "$D_i$" and "$D_o$". The inner and outer diameter dimensions may vary depending on the particular application, but generally will range from 0.1 to 6 inches for inner diameter $D_i$ and 0.1 to 6 inches for outer diameter $D_o$, with an overall wall thickness, ranging from 0.01 to 0.5 inches. Alternatively, the inner diameter may range from 0.25 to 3 inches, the outer diameter may range from 0.25 to 3 inches, and the wall thickness may range from 0.05 to 0.2 inches. However, it is also contemplated the reinforced hose assembly 10 may have other dimensions as will be appreciated by one of ordinary skill in the art. The inventors have surprisingly realized that the reinforced hose assembly 10 of the present invention could have thin walls which allow greater levels of flexibility and yet still prevent the permutation of fluids and gases through the walls.

The tubular inner layer 14 is manufactured with a first fluorocarbon polymer. The first fluorocarbon polymer may include, but is not limited to, polytetrafluoroethylene (PTFE), ethylene tetrafluoroethylene (ETFE), fluorinated ethylenepropylene (FEP), polyvinylidine fluoride (PVDF), perfluoroalkoxy fluorocarbons (PFA), polychlorotrifluoroethylene (PCTFE), and combinations thereof. In one specific embodiment, the first fluorocarbon polymer comprises tetrafluoroethylene. Alternatively, it is also contemplated that the tubular inner layer 14 may comprise other fluorocarbon materials as will be appreciated by one of ordinary skill in the art. Furthermore, in some embodiments, the tubular inner layer 14 may be formed from other polymeric materials besides fluorocarbon polymers.

The uniform interior radial surface 16 is substantially smooth and devoid of corrugations. In other words, the uniform interior radial surface 16 is free from undulations that affect the fluid flow and increase potential contamination between subsequent batches. The exterior radial surface 18 may be substantially smooth, or may have a superficial roughness to allow the increased bond strength of the subsequently attached layers.

Referring to FIGS. 1-5 generally, the reinforced hose assembly 10 may further comprise a bonding layer 20 disposed about the exterior radial surface 18 of the tubular inner layer 14. The bonding layer 20 may comprise a second fluorocarbon polymer. The bonding layer 20 may bond to the exterior radial surface 18 and simultaneously bond to a reinforcing element 22.

The second fluorocarbon polymer may be chosen from the group that includes, but is not limited to, PTFE, ETFE, FEP, PVDF, PFA, PCTFE and combinations thereof. In one specific embodiment, the second fluorocarbon polymer comprises FEP. Alternatively, it is also contemplated that the bonding layer 20 may comprise other fluorocarbon materials as will be appreciated by one of ordinary skill in the art. Furthermore, the bonding layer 20 may be formed from other polymeric materials other than fluorocarbon polymers in some embodiments of the present invention. The first fluorocarbon polymer may be the same as or different than the second fluorocarbon polymer.

Figure 2:
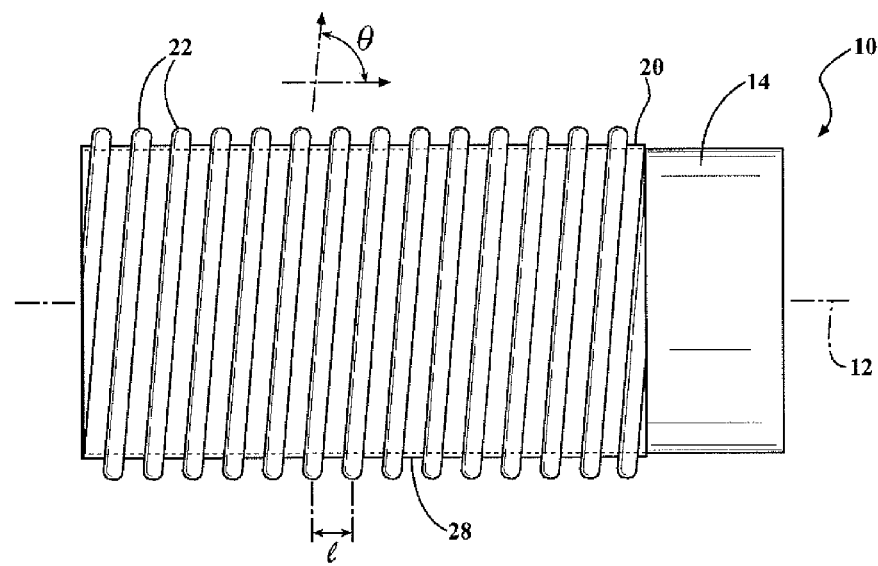
FIG. 2 is a cut away view of the reinforced hose assembly of FIG. 1.

Referring to FIG. 2, the reinforced hose assembly 10 also includes the reinforcing element 22. The reinforcing element 22 may be attached to the bonding layer 20 and helically disposed about the tubular inner layer 14 at a predetermined helical pitch measured relative to the longitudinal axis 12 of the tubular inner layer 14. The reinforcing element 22 provides a smooth and efficient load transferring surface to improve the internal pressure resistance of the reinforced hose assembly 10.

The reinforcing element 22 can be attached to the exterior radial surface 18 or the bonding layer 20 by a variety of ways, as will be appreciated by one of ordinary skill in the art. For example, the reinforcing element 22 can be attached to the bonding layer 20 through adhesion, through various fasteners, or through chemically bonding the reinforcing element 22 to the bonding layer 20. In one specific embodiment, the reinforcing element 22 is fused to the bonding layer 20.

As referred to throughout this disclosure, the terms "fusing," or "fused" are intended to mean the formation of an integral tubular composite structure through the combination of two or more materials that are chemically compatible. In order for fusing to occur, the materials to be fused must reach a temperature at which the materials begin to melt. Thus, the term "fused" is used herein is intended to describe the bond that occurs when both materials to be fused are heated to a temperature above their melt temperature, placed in contact with one another, and cooled below their melt temperatures. More specifically, reference to melt temperature is intended to mean a temperature at which the materials to be bonded no longer contain significant crystallinity.

Referring to FIG. 6, it is also contemplated that the reinforcing element 22 may be attached directly to the exterior radial surface 18 of the tubular inner layer 14 without the use of a bonding layer 20. As such, the tubular inner layer 14 and the reinforcing element 22 may be formed from chemically compatible materials.

As mentioned above, the reinforcing element 22 comprises the second fluorocarbon polymer. Exemplary second fluorocarbon polymers are described above with regard to the bonding layer 20. The reinforcing element 22 may also include a reinforcing material in addition to the second fluorocarbon polymer to provide additional structural rigidity. The reinforcing material may comprise a hardened plastic or resin, metal, or other material. Alternatively, in one or more embodiments, the reinforcing element 22 may be free from any reinforcing material. Thus, the reinforcing element 22 may alternatively consist, or consist essentially of, the second fluorocarbon polymer. By "consist essentially of," it is intended that the reinforcing element 22 includes only second fluorocarbon polymer type materials, and is free from all other types of materials which significantly affect the function of the reinforcing element 22. In some embodiments, because the reinforcing element 22 comprises the second fluorocarbon polymer, it is sufficiently rigid, and does not require the use of the reinforcing material, thus saving on both cost and manufacturing complexity.

The reinforcing element 22 has a cross-sectional profile designed to provide optimal bond strength and reinforcement. The reinforcing element 22 provides the reinforced hose assembly 10 with resistance to collapse from bending at tight routing radii and from a high net positive external pressure such as may be developed from externally imposed forces, as may be found in submerged applications, or from vacuum, as may be found within suction applications. Many different cross-sectional profiles can be used in conjunction with the reinforced hose assembly 10 without departing from the scope of the invention. For example, the cross-sectional profile may be elliptical, circular, closed parabola, quadrilateral-shaped, omega-shaped, or D-shaped. Alternatively, it is also contemplated that the cross-sectional profile may comprise other shapes and forms sufficient to provide adequate structural rigidity and bond strength.

Figure 3:
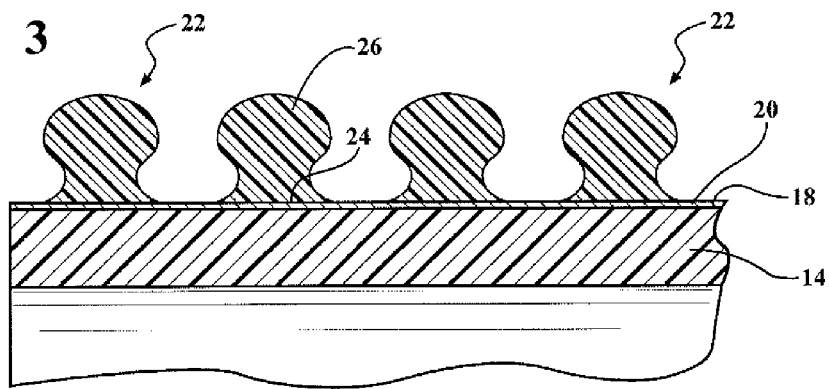
FIG. 3 is a cross-sectional view of a reinforced hose assembly in accordance with one embodiment.

In another possible configuration, referring to FIG. 3, the reinforcing element 22 has an omega-shaped cross-sectional profile comprising the flat foot section 24 and the rounded body section 26. The flat foot section 24 is attached to the bonding layer 20 and the rounded body section 26 is positioned adjacent to and integral with the flat foot section 24. The width of the rounded body section 26 is smaller than the widest portion of the rounded body section 26 at the area where the rounded body section 26 attaches to the flat foot section 24. The inventors have surprisingly realized that the omega-shaped cross-sectional profile increases the bond strength of the reinforcing element 22 to the exterior radial surface 18 or the bonding layer 20, while simultaneously providing enhanced flexibility to the reinforced hose assembly 10.

Figure 4:
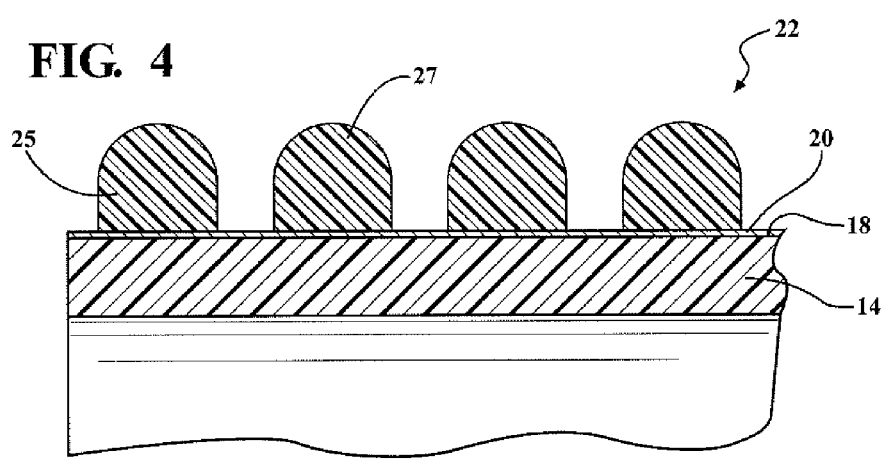
FIG. 4 is a cross-sectional view of the reinforced hose assembly in accordance with another embodiment.
Figure 5:
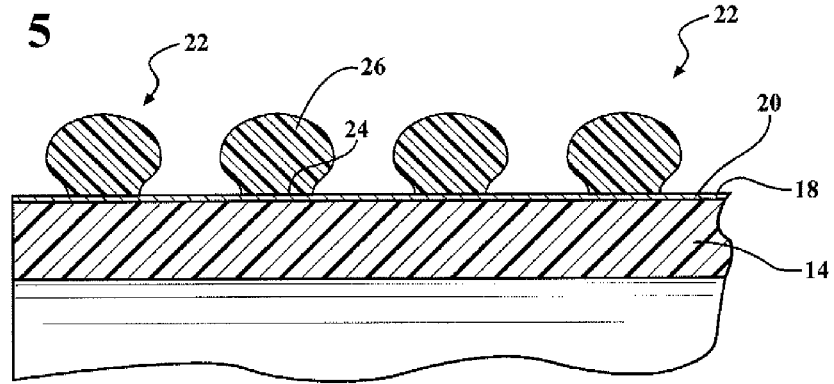
FIG. 5 is a cross-sectional view of the reinforced hose assembly in accordance with yet another embodiment.

Referring to FIG. 4, in one embodiment, the reinforcing element 22 can also have a D-shaped cross-sectional profile comprising a flat base section 25 and a curved body section 27. The flat base section 25 may be attached to the bonding layer 20. The curved body section 27 is positioned adjacent to and integral with the flat base section 25. Referring to FIG. 5, in another embodiment, the reinforcing element 22 may have an elliptical cross-sectional profile.

The cross-sectional profile may vary along a length of the reinforcing element 22. For example, the cross-sectional profile may get larger or smaller along the longitudinal dimension. In one exemplary embodiment, the longitudinal pitch of the reinforcing element 22 may increase or decrease along the longitudinal dimension. This would allow the reinforced hose assembly to be customized to a specific application or routing requirement.

Referring again to FIG. 2, the reinforcing element 22 is helically disposed about the tubular inner layer 14, such that the reinforcing element 22 is disposed at a constant angle to the exterior radial surface 18 of the tubular inner layer 14. In one specific embodiment, the reinforcing element 22 is applied in one direction at a predetermined helical pitch measured in turns per inch (TPI). The predetermined helical pitch may range from 5 to 30 TPI. Alternatively, the predetermined pitch may range from 8 to 20 TPI. It is also contemplated that the predetermined helical pitch may be outside this range.

The predetermined helical pitch determines the predetermined pitch angle Θ. The predetermined pitch may be selected depending upon the desired convergence of strength, elongation, kink resistance and volumetric expansion characteristics of the reinforced hose assembly 10. In general, higher predetermined pitch angles will result in decreased radial expansion of the reinforced hose assembly 10 under pressure, but an increase in axial elongation. The predetermined pitch angle Θ may range from 70 to 89 degrees to minimize elongation. Alternatively, the predetermined pitch angle Θ may range from 80 to 89 degrees, 85 to 89 degrees, or from 86 to 88 degrees. It is also contemplated that the predetermined pitch angle Θ may be less than 80 degrees to develop a radially-inwardly directed force component for more efficient load transfer.

The reinforcing element 22 is applied at less than 100% coverage thereof, and preferably at a coverage ranging from 30 to 85%. In this way, the open helix so formed is defined by a series of turns. Each of these turns may be seen to be spaced-apart by an axial distance or lead, referenced at "l," ranging from about 0.03 to 0.2 inches from an adjacent turn to define successive turn pairs. An interstitial area 28 is defined between the adjacent turns in each of these pairs.

Following the application of the reinforcing element 22, an outer cover or sheath may optionally be applied for the purpose of increasing strength, durability, and kink resistance of the reinforced hose assembly 10. The outer cover may be applied with cross head extruder or a spiral wound capping, typically comprising an abrasion-resistant polymeric material such as a polyamide, polyolefin, polyvinyl chloride, or polyurethane. The outer cover may include braided or woven fibers or a jacket, or combinations thereof. The fibers can comprise any material known to those skilled in the art. Preferably, the fibers comprise at least one of a polymer, a fiberglass, a metal, or combinations thereof. The type and amount of outer cover materials utilized depends on the intended use of the reinforced hose assembly 10.

Referring generally to FIG. 6, a method of manufacturing a reinforced hose assembly 10 is also provided. The method includes the step of applying the bonding layer 20 formed from the second fluorocarbon polymer to the exterior radial surface 18 of the tubular inner layer 14.

In one embodiment, the method of manufacturing the reinforced hose assembly 10 may comprise forming the tubular inner layer 14. The tubular inner layer 14 can be formed by extrusion with an extrusion die 110. If necessary, the tubular inner layer 14 may be extruded over a mandrel 112 for a support. Alternatively, the tubular inner layer 14 may be formed in other ways, such as tape extrusion, as will be appreciated by one of ordinary skill in the art. During the formation process, the tubular inner layer 14 may be cooled by a water bath 114, spray, or similar cooling unit operation. In addition, during the formation process, the tubular inner layer 14 can be cured with infrared ovens 116 or a alternative heating/curing system. Furthermore, during the extrusion process, various lubricants may be used to aid in the formation of the tubular inner layer 14.

After formation, the tubular inner layer 14 may be collected on a reel or other take-up device for further processing, or may be utilized real-time in an integrated wrapping step as described below.

The bonding layer 20 may be applied in various ways, as will be appreciated by one of ordinary skill in the art. The bonding layer 20 may be applied to the exterior radial surface 18 by spraying with the second fluorocarbon polymer with a bonding layer applicator device 118. Alternatively, the bonding layer 20 can be applied by dipping the exterior radial surface 18 into the bonding layer applicator device 118, or the bonding layer 20 may be brushed on the exterior radial surface 18 with the bonding layer application device 118. The bonding layer 20 can be applied neat, or may be applied in the form of an emulsion. The emulsion may comprise a mixture of the second fluorocarbon polymer, surfactants, and water. If the bonding layer 20 is applied via an emulsion, the emulsion can be applied before the inner tubular layer 14 enters the infrared oven 116. Accordingly, the bonding layer 20 can be dried before subsequent application of the reinforcing element 22. The bonding layer 20, if applied, has a thickness ranging from 0.001 to 0.1 inches, or from 0.0001 to 0.004 inches.

The reinforced hose assembly 10 can optionally include a surface treatment on the exterior radial surface 18 or the bonding layer 20. More specifically, the exterior radial surface 18 of the inner tubular layer 14, with or without the bonding layer 20 applied thereto, can include the surface treatment such as a coupling agent, a primer, and/or various other surface treatments such as physical, chemical, plasma, or corona etching. Typically, the surface treatment is applied to the exterior radial surface 18 of the inner tubular layer 14 to facilitate bonding of materials thereto.

The method may also include forming the reinforcing element 22. The reinforcing element 22 may be formed in a manner that will be appreciated by one of ordinary skill in the art. For example, the reinforcing element 22 may be formed by extrusion, and later wrapped along the bonding layer 20 or along the exterior radial surface 18 of the tubular inner layer 14. Alternatively, the reinforcing element 22 may be formed with molding processes and similar manufacturing systems. It is also contemplated that the reinforcing element 22 may be coextruded or sequentially extruded with the tubular inner layer 14. After attachment of the reinforcing element 22 to the exterior radial surface 18 or the bonding layer 20, the reinforced hose assembly 10 may be heated in the infrared oven 116.

Referring again to FIG. 6, the method also includes the step of wrapping the reinforcing element 22 around the exterior radial surface 18 of the tubular inner layer 14 at the predetermined helical pitch ranging from 5 to 30 TPI and measured relative to the longitudinal axis 12 of the tubular inner layer 14. The wrapping may be completed as the reinforcing element 22 is extruded or the wrapping may be completed after both the reinforcing element 22 and the tubular inner layer 14 have been formed. The wrapping may be completed in conjunction with a spiral winder 120 that rotates the tubular inner layer 14 as it is formed. The reinforcing element 22 may be applied under tension to ensure optimal wrapping, as will be appreciated by one of ordinary skill in the art. Alternatively, the method may include rotating the reinforcing element 22 around the tubular inner layer 14, simultaneously or after formation of the reinforcing element 22.

The method includes the step of heating the reinforcing element 22, the bonding layer 20, and the tubular inner layer 14 to a temperature above 600 degrees F. to fuse the reinforcing element 22 to the bonding layer 20. Alternatively, the heating step may include heating the reinforcing element 22, the bonding layer 20 and tubular inner layer 14 to a temperature ranging from 600 to 800 degrees F., or from 650 to 750 degrees F. The heating step ensures that the reinforcing element 22 is able to adequately attach to the bonding layer 20 or the exterior radial surface 18. Furthermore, the step of heating ensures that any volatiles remaining in the bonding layer 20 are driven off. As indicated above, the heating step may be conducted in the oven 116. However, it is also contemplated that the heating step may be completed with alternative heating devices as will be appreciated by one of ordinary skill in the art.

It is also contemplated that the reinforcing element 22 may be fused directly to the exterior radial surface 18. Both of the surfaces to be fused must be heated to a temperature above their melt temperatures and placed in direct physical contact with one another.

In addition, the method of manufacturing the reinforced hose assembly 10 may include subjecting the inner tubular layer 14 to a deformation force to constrain the convolutions ordinarily formed during the wrapping step. The deformation force may be provided via mandrel 122. In one embodiment, subjecting the inner tubular layer 14 to a deformation force to constrain convolutions results in the formation of uniform inner radial surface 16 that is free from undulations and is substantially smooth.

The step of subjecting the inner tubular layer 14 to a deformation force to constrain convolutions may be performed during the step of heating the tubular inner layer 14, the bonding layer 20, and the reinforcing element 22; during the step of wrapping the reinforcing element 22 around the exterior radial surface 18; or during the step of fusing the reinforcing element 22 to the bonding layer 20 or the exterior radial surface 18.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. It is intended that the invention not be limited to the particular embodiment disclosed as the best mode contemplated for carrying out this invention, but that the invention will include all embodiments falling within the scope of the appended claims.

What is claimed is:

1. A reinforced hose assembly comprising:
   a tubular inner layer having a uniform interior radial surface and an exterior radial surface with said tubular inner layer defining a longitudinal axis along a thereof and said tubular inner layer comprising a first fluorocarbon polymer,
   a bonding layer comprising a second fluorocarbon polymer and disposed about said exterior radial surface, and
   a reinforcing element consisting essentially of said second fluorocarbon polymer attached to said bonding layer and helically disposed about said tubular inner layer at a predetermined helical pitch as measured relative to said longitudinal axis of said tubular inner layer; and
   wherein said reinforcing element is attached to said bonding layer with a fused bond between said reinforcing element and said bonding layer.

2. The reinforced hose assembly of claim 1 wherein said reinforcing element has an omega shaped cross-sectional profile comprising a flat foot section and a rounded body section with said flat foot section attached to said bonding layer and said rounded body section positioned adjacent to and integral with said flat foot section.

3. The reinforced hose assembly of claim 1 wherein said reinforcing element has an elliptical cross-sectional profile.

4. The reinforced hose assembly of claim 1 wherein said reinforcing element has a D-shaped cross-sectional profile comprising a flat base section and a curved body section with said flat base section attached to said bonding layer and said curved body section positioned adjacent to and integral with said flat base section.

5. The reinforced hose assembly of claim 1 wherein said reinforcing element has a cross-sectional profile that varies along a length of said reinforcing element.

6. The reinforced hose assembly of claim 1 wherein said predetermined helical pitch ranges from 5 to 30 turns per inch.

7. The reinforced hose assembly of claim 1 wherein said uniform interior radial surface of said tubular inner layer is substantially smooth and devoid of corrugations.

8. The reinforced hose assembly of claim 1 wherein said first fluorocarbon polymer comprises polytetrafluoroethylene.

9. The reinforced hose assembly of claim 1 wherein said second fluorocarbon polymer comprises a material selected from the group consisting of polytetrafluoroethylene, ethylene tetrafluoroethylene, fluorinated ethylenepropylene, polyvinylidine fluoride, perfluoroalkoxy fluorocarbons, polychlorotrifluoroethylene, and combinations thereof.

10. The reinforced hose assembly of claim 1 wherein said second fluorocarbon polymer comprises fluorinated ethylenepropylene.

11. A reinforced hose assembly comprising:
    a tubular inner layer having a uniform interior radial surface and an exterior radial surface with said tubular inner layer defining a longitudinal axis along a length thereof and comprising a first fluorocarbon polymer, and
    a reinforcing element consisting essentially of a second fluorocarbon polymer and helically disposed about and fused to said tubular inner layer at a predetermined helical pitch as measured relative to said longitudinal axis of said tubular inner layer.

12. The reinforced hose assembly of claim 11 wherein said reinforcing element comprises an omega-shaped cross-sectional profile comprising a flat foot section and a rounded body section with said flat foot section attached to said exterior radial surface and said rounded body section positioned adjacent to and integral with said flat foot section.

13. The reinforced hose assembly of claim 11 further including a bonding layer comprising said second fluorocarbon polymer and disposed about said exterior radial surface with said reinforcing element attached to said bonding layer.

14. The reinforced hose assembly of claim 13 wherein said reinforcing element is attached to said bonding layer with a fused bond between said reinforcing element and said bonding layer.

15. The reinforced hose assembly of claim 11 wherein said uniform interior radial surface of said tubular inner layer is substantially smooth and devoid of corrugations.

16. A method of manufacturing a reinforced hose assembly with a tubular inner layer and a reinforcing element with the tubular inner layer having a uniform interior radial surface and an exterior radial surface with the tubular inner layer defining a longitudinal axis along a length thereof and comprising a first fluorocarbon polymer and wherein the reinforcing element is formed from and consists essentially of a second fluorocarbon polymer, said method comprising the steps of:
    applying a bonding layer formed from the second fluorocarbon polymer to the exterior radial surface of the tubular inner layer, wrapping the reinforcing element around the exterior radial surface of the tubular inner layer at a predetermined helical pitch ranging from 5 to 30 turns per inch as measured relative to the longitudinal axis of the tubular inner layer, and heating the reinforcing element, the bonding layer, and the tubular inner layer to a temperature above 600 degrees F. to fuse the reinforcing element to the bonding layer.

17. The method of claim 16 wherein the step of heating the reinforcing element is further defined as heating the reinforcing element, bonding layer, and tubular inner layer to a temperature ranging from 650 to 800 degrees F.

18. The method of claim 16 further comprising the steps of forming the tubular inner layer from the first fluorocarbon polymer and forming the reinforcing element from the second fluorocarbon polymer wherein the first fluorocarbon comprises polytetrafluoroethylene and the second fluorocarbon polymer comprises fluorinated ethylenepropylene.

* * * * *